(12) United States Patent
Huang (10) Patent No.: US 6,658,739 B1
(45) Date of Patent: Dec. 9, 2003

(54) PIPE CUTTER

(76) Inventor: De Lun Huang, 11, Alley 2 Lane 673 Tu Cheng Rd., Ta-Le City, Taichung Hsien (TW)

( * ) Notice: Subject to any disclaimer, the term of this patent is extended or adjusted under 35 U.S.C. 154(b) by 0 days.

(21) Appl. No.: 10/194,091

(22) Filed: Jul. 11, 2002

(51) Int. Cl.[7] .................................................. B26D 3/16
(52) U.S. Cl. .............................. 30/96; 30/101; 30/102
(58) Field of Search .......................... 30/101, 92, 93, 30/102, 96

(56) References Cited

U.S. PATENT DOCUMENTS

| | | | | |
|---|---|---|---|---|
| 3,237,301 A | * | 3/1966 | Wilson | 30/102 |
| 3,885,261 A | * | 5/1975 | Skvarenina | 7/157 |
| 4,438,562 A | * | 3/1984 | Courty | 30/99 |
| 5,345,682 A | * | 9/1994 | Dubinsky et al. | 30/102 |
| 5,414,932 A | * | 5/1995 | Azkona | 30/96 |
| 5,515,609 A | * | 5/1996 | Sperti | 30/101 |
| 6,202,307 B1 | * | 3/2001 | Wrate | 30/101 |
| 6,393,700 B1 | * | 5/2002 | Babb | 30/102 |
| 6,401,340 B1 | * | 6/2002 | King | 30/102 |

FOREIGN PATENT DOCUMENTS

RU     2071396 C1 * 1/1997

* cited by examiner

*Primary Examiner*—Allan N. Shoap
*Assistant Examiner*—Phong Nguyen
(74) *Attorney, Agent, or Firm*—Pro-Techtor International Services (57) ABSTRACT

A pipe cutter comprises a fastening mechanism including two pivot members on both sides of a top recess, two bifurcated pivot links, two rollers on top ends of the pivot members, an upper rotary blade, and a lower transmission mechanism. The transmission mechanism is operative to pivot the fastening mechanism for forming a three-point support (i.e., the rollers and the blade) of a pipe to be cut. A number of configurations of the cutter are possible.

6 Claims, 12 Drawing Sheets

PIPE CUTTER

BACKGROUND OF THE INVENTION

1. Field of the Invention

The present invention relates to pipe cutters and more particularly to such a pipe cutter with improved characteristics.

2. Description of Related Art

A variety of pipe cutters are commercially available. However, most of them have been ineffective as detailed below For example, a distance between two fastening rollers is not sufficient to hold firmly a pipe having a relatively large diameter therebetween (i.e., unreliable fastening). A solution to the above is a provision of a variety of pipe cutters for accommodating pipes having various sizes. This inevitably will bear a great burden of cost upon the user. Further, fastening and cutting of a pipe are two discontinuous operations. That is, a single operation for effecting fastening and cutting is made impossible in the prior art. Thus, it is desirable to provide an improved pipe cutter in order to overcome the above drawbacks of the prior art.

SUMMARY OF THE INVENTION

It is an object of the present invention to provide a pipe cutter comprising a main body including an internal elongate slot, a top recess, and two side guides on a tunnel between the recess and the slot; a fastening mechanism including two pivot members on both sides of the recess, each pivot member having a lower end pivotably connected to the main body, two bifurcated links each having a top end pivotably connected to the pivot member, and two rollers each rotatably connected to a top end of the pivot member; a cutting mechanism including a sliding block defined by the guides, a top rotary blade, and a first spring having a top end urged against the bottom of the sliding block; and a transmission mechanism including a sliding toothed member fitted in the main body, a pivot axis slidable along the length of the slot and pivotably connected the links and the top of the sliding toothed member together, an outer knob having a pinion and an outer ratchet wheel both being corotated with the knob in a predetermined direction, a second spring biased between the bottom of the sliding toothed member and the bottom of the main body, a spring biased pawl engageable with the ratchet wheel, a first gear rotatably connected to the main body and meshed with both the teeth at one side of the sliding toothed member and the pinion, a second gear rotatably connected to the main body and meshed with both the teeth at the other side of the sliding toothed member and the first gear, and a spring biased push button in a recessed portion of the main body opposite to the knob, the push button being connected to the pinion; wherein in a fastening and cutting operation of a pipe, place the pipe into the recess on the top of the blade, rotate the knob clockwise to cause the pinion to rotate the meshed first and the second gears, in response the sliding toothed member-slides down to compress the second spring due to gear engagements of left and right teeth thereof with the first and the second gears respectively, the links move down to swing the pivot members toward the recess to cause the rollers to contact the pipe, and a continuous rotation of the knob causes the rollers to press down the pipe toward the blade for being cut as the first spring is compressed; and in a returning process, push the push button to cause the knob to project above the outer surface of the main body for disengaging the ratchet wheel and the pinion from the pawl and the first gear respectively, in response, the sliding toothed member moves upward immediately as the expansion of the second spring, and the links move upward to cause the pivot members to swing outward away from each other until being stopped in their original unused positions.

It is another object of the present invention to provide a pipe cutter comprising a main body including an internal elongate slot and a top recess; a fastening mechanism including two pivot members on both sides of the recess, each pivot member being substantially horizontally disposed and pivotably connected to the main body, two bifurcated links each having a top end pivotably connected to the pivot member, and two rollers each rotatably connected to a top end of the pivot member; a cutting mechanism including a top rotary blade; and a transmission mechanism including a rotary handle on the bottom of the main body, the handle including a top peripheral flange and an intermediate peripheral flange, an internal threaded shank threadedly secured to an inner thread of a middle cylinder, the top of the shank being pivotably connected to the links by means of a pivot axis which is defined to be slidable along the length of the slot, a chamber on the top of the handle and having an inwardly extending rim on the bottom, a neck on the top of the chamber being in communication with the chamber, and a spring put on the shank being biased between the bottom of the chamber and the top of the neck wherein the top peripheral flange has a diameter larger than that of the rim and the intermediate peripheral flange has a diameter larger than an outer diameter of the chamber so as to prevent the handle from being slid out of the chamber; wherein in a fastening and cutting operation of a pipe, rotate the handle in a first direction to cause it to move upward with respect to the main body with the spring being compressed, in response, the links move upward to cause the pivot members to swing upward away from the recess, place the pipe into the recess on the top of the blade, release the handle to cause it to move downward as the expansion of the spring, in response, the pivot members swing toward the recess to cause the rollers to contact the pipe, rotate the handle again to cause it to move upward, in response, the shank moves down as a thread proceeding the middle cylinder and the shank, continues the rotation of the handle until stopped by the chamber with the pipe being cut by the blade during the rotation of the handle; and in a returning process, rotates the handle in an opposite second direction to remove the cut pipe.

It is still another object of the present invention to provide a pipe cutter comprising a main body including a top recess; a fastening mechanism including two links on both sides of the recess, each link being pivotably connected to the main body, an elongate slot in each of the links, and two rollers each rotatably connected to a top end of the link; a cutting mechanism including a sliding device having a lower cavity and two side joints slidably disposed in the slots for slidably connecting the sliding device and the link together and a top rotary blade rotatably disposed in the sliding device; and a transmission mechanism including a rotary handle on the bottom of the main body, the handle being rotatably fixed to the bottom of the main body, the handle including a multi-sided hole, and a shank with a lower portion received in the hole and an upper portion fixed in the cavity, the shank having an upper thread section and a mating thread member screwed thereonto; wherein in a fastening and cutting operation of a pipe, place the pipe into the recess on the top of the blade, rotate the handle in a first direction to cause the shank to rotate, in response, the shank moves up as a thread proceeding of the nut and the thread section thereof, the sliding device is moved up by the upward movement of the shank with the side joints moving upward along the slots, in response, the links swing toward the recess until the rollers contact the pipe, continuously rotate the handle to cause the rollers to press down the pipe with the pipe being cut by the blade during the rotation of the handle; and in a returning process, rotates the handle in an opposite second direction to remove the cut pipe. The above and other objects, features and advantages of the present invention will become apparent from the following detailed description taken with the accompanying drawings.

DETAILED DESCRIPTION OF THE PREFERRED EMBODIMENTS

Referring to FIGS. 1 to 7, there is shown a pipe cutter constructed in accordance with a first preferred embodiment of the invention. The cutter comprises a main body 40 including an internal elongate slot 41 near center, a top recess 43, and two side guides 42 on a tunnel between the recess 43 and the slot 41; a fastening mechanism 10 including two pivot members 11 on both sides of the recess 43, each pivot member 11 having a lower end pivotably connected to internal walls of the main body 40, two bifurcated links 12 each having a top end pivotably connected to the center of the pivot member 11, and two rollers 13 each rotatably connected to a top end of the pivot member 11; a cutting mechanism 20 including a sliding block 22 defined by the guides 42, a pivot pin 24 in the sliding block 22, a top circular blade 21 with the pin 24 fixedly passed through its center (i.e., the blade 21 is rotatable), and a coil spring 23 having a top end urged against the bottom of the sliding block 22; a transmission mechanism 30 including a sliding toothed member 31 fitted in the main body 40, a pivot axis 32 slidable along the length of the slot 41 and pivotably connected the links 12 and the top bifurcated portions of the sliding toothed member 31 together, a knob 33 on the outer surface of the main body 40 and having an associated pinion 331 and an outer ratchet wheel 332 both being corotated with the knob 33 in a predetermined direction (e.g., clockwise), a coil spring 34 biased between the bottom of the sliding toothed member 31 and the bottom of the inner surface of the main body 40, a spring biased pawl 35 engageable with the ratchet wheel 332, a first gear 36 rotatably connected to the internal walls of the main body 40 and meshed with both the teeth at one side of the sliding toothed member 31 and the pinion 331, a second gear 37 rotatably connected to the internal walls of the main body 40 and meshed with both the teeth at the other side of the sliding toothed member 31 and the first gear 36, a push button 38 on the side opposite to the knob 33 being connected to the pinion 331 by a shank, and a coil spring 39 biased between the push button 38 and a recessed portion of the outer surface of the main body 40.

Figure 1:
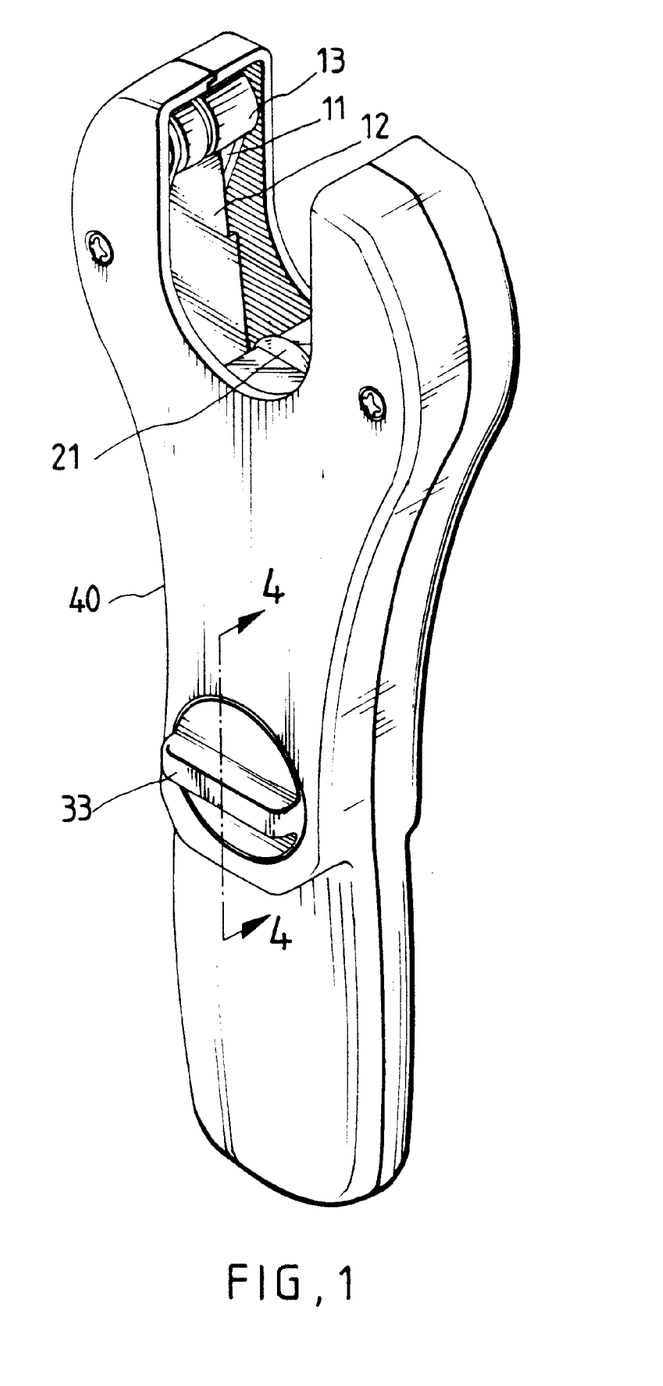
FIG. 1 is a perspective view of a first preferred embodiment of a pipe cutter according to the invention.
Figure 2:
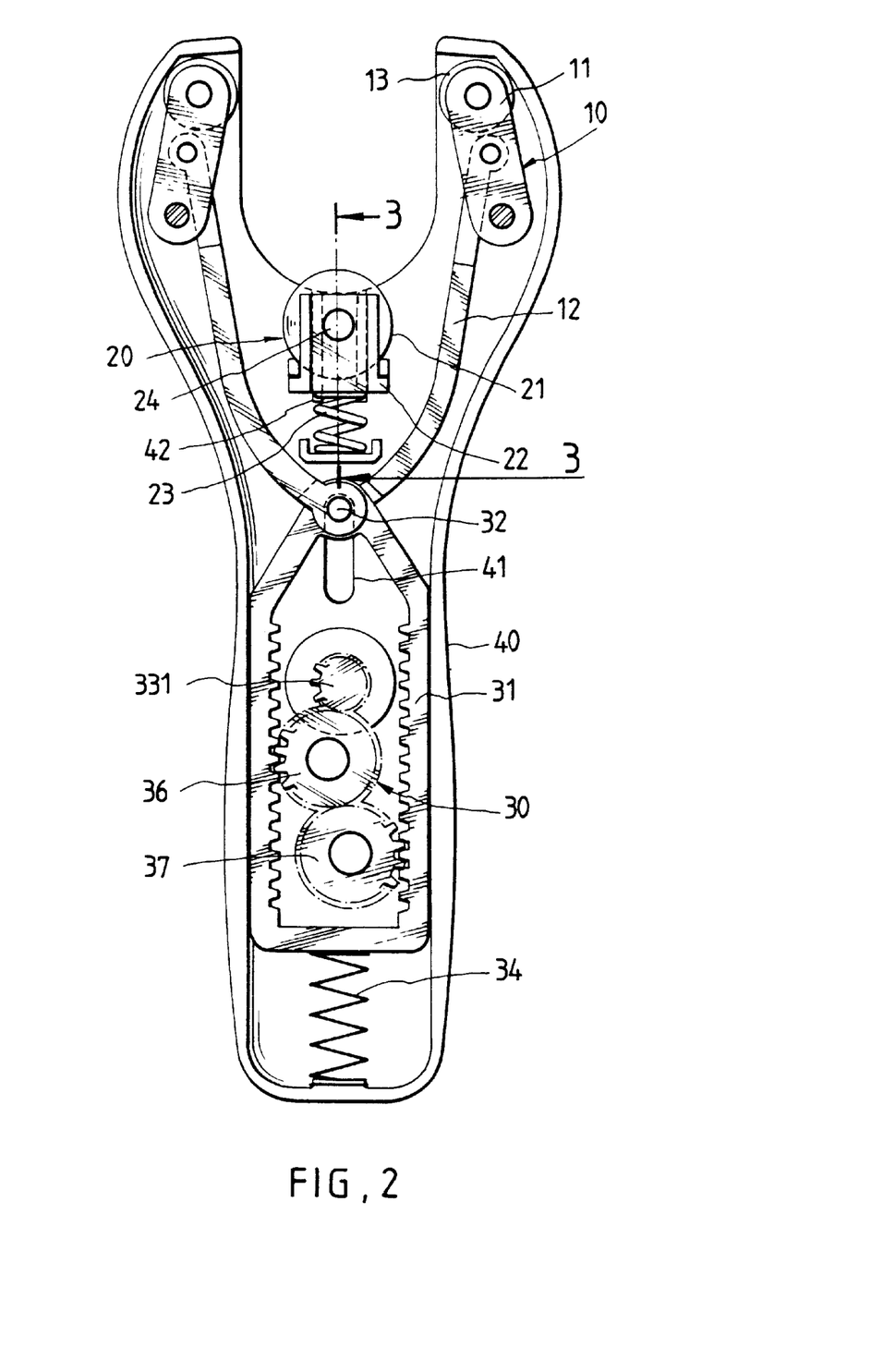
FIG. 2 is a side view in part section with half of the cutter's main body removed.
Figure 3:
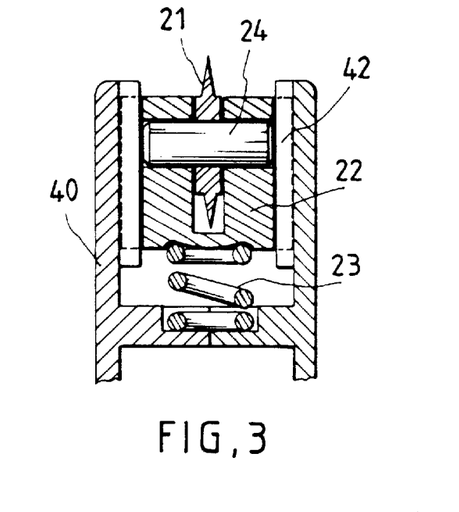
FIG. 3 is a sectional view taken along line 3—3 of FIG. 2.
Figure 4:
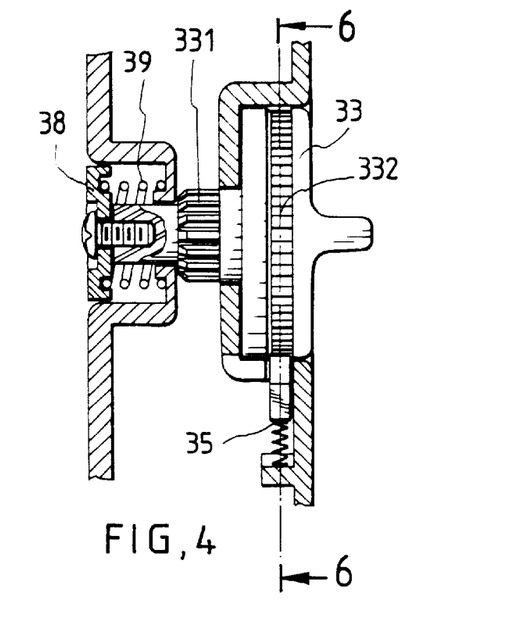
FIG. 4 is a sectional view taken along line 44 of FIG. 1 where the push button is not activated.
Figure 5:
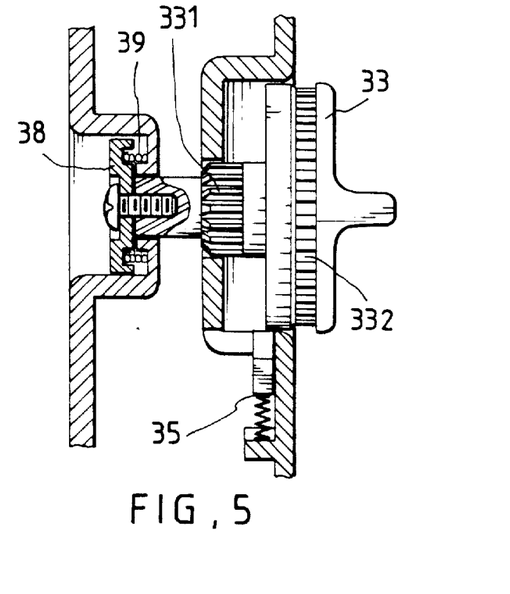
FIG. 5 is a view similar to FIG. 4 where the push button is activated to disengage the ratchet wheel from the pawl.
Figure 6:
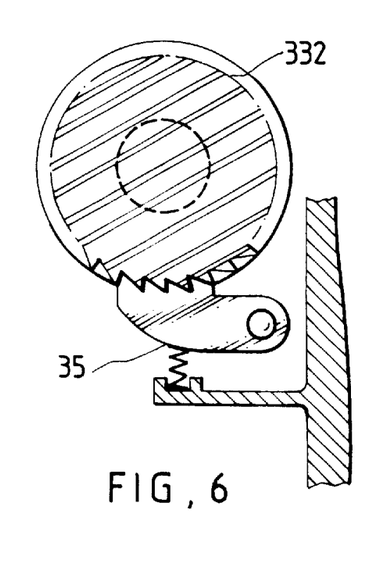
FIG. 6 is a sectional view taken along line 6—6 of FIG. 4.
Figure 7:
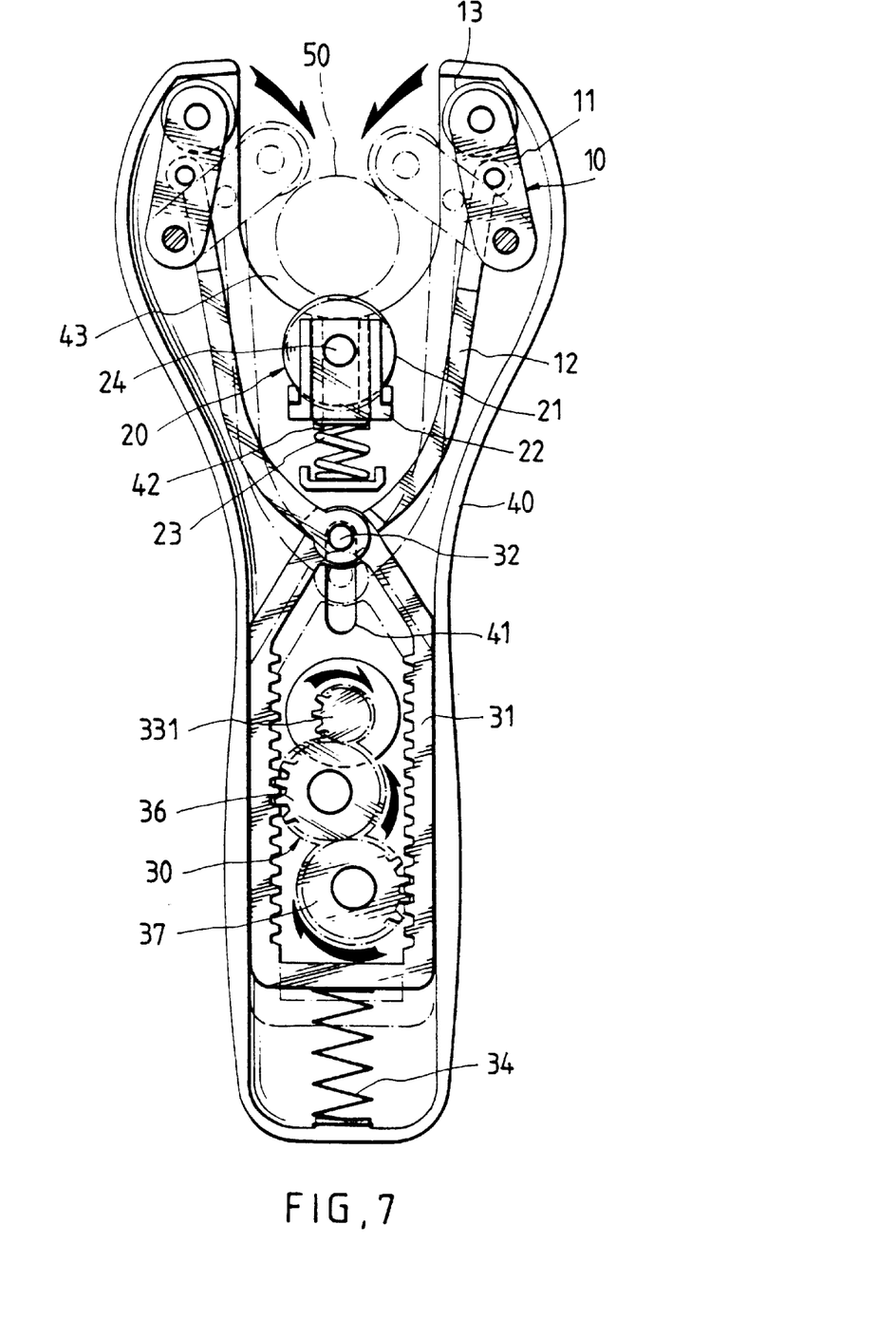
FIG. 7 is a view similar to FIG. 2 illustrating a continuous fastening and cutting operation of the first preferred embodiment of the invention.
Figure 8:
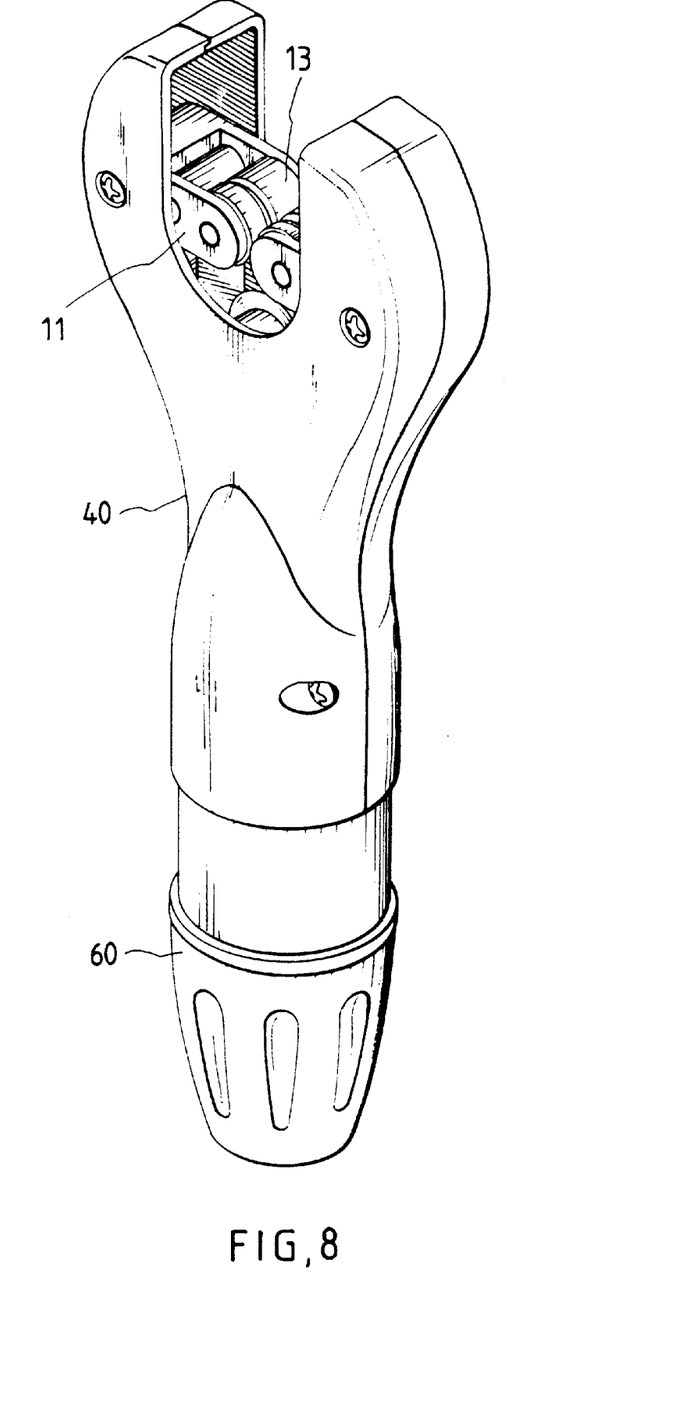
FIG. 8 is a perspective view of a second preferred embodiment of a pipe cutter according to the invention.
Figure 9:
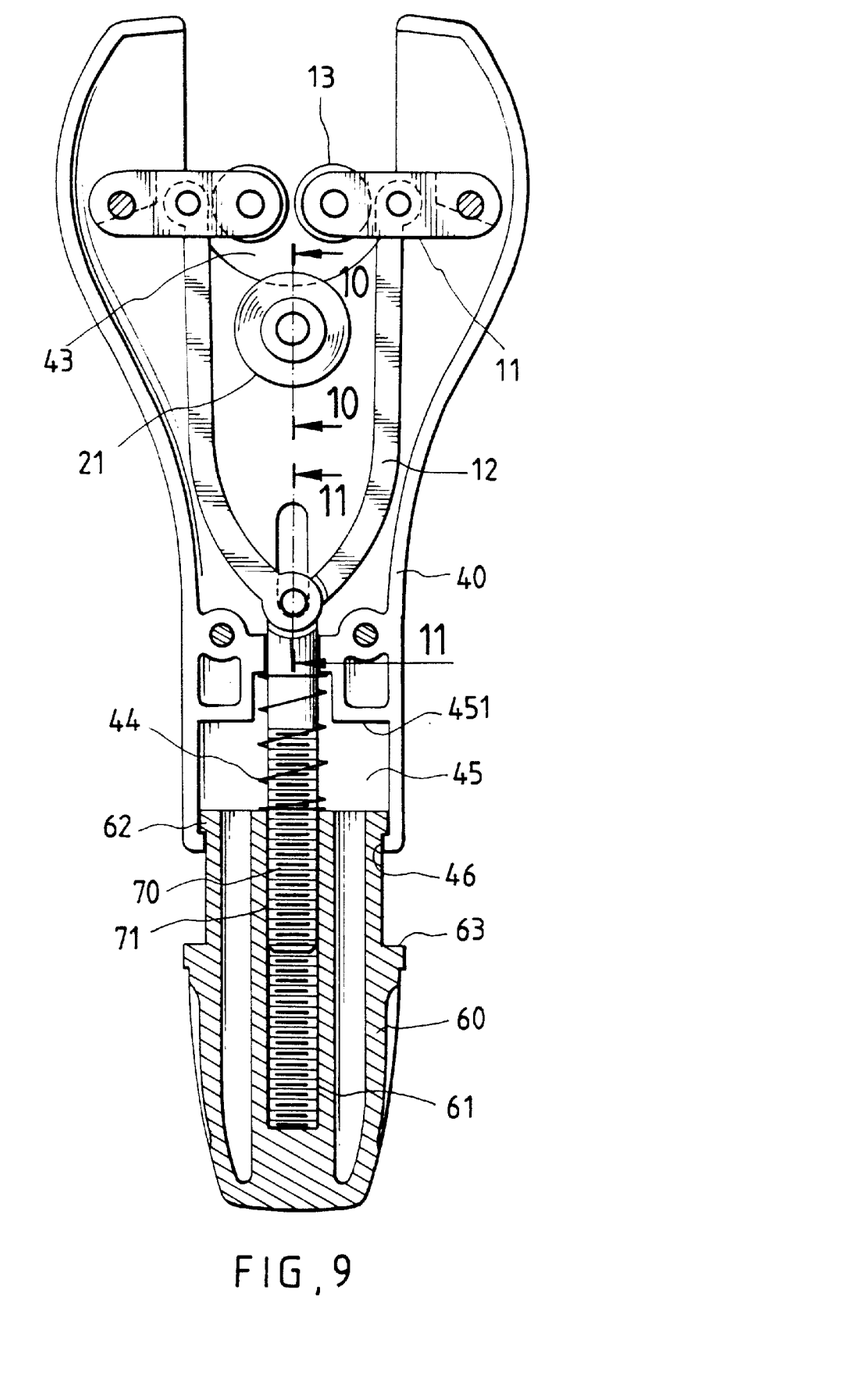
FIG. 9 is a side view in part section with half of the cutter's main body of FIG. 8 removed.
Figure 10:
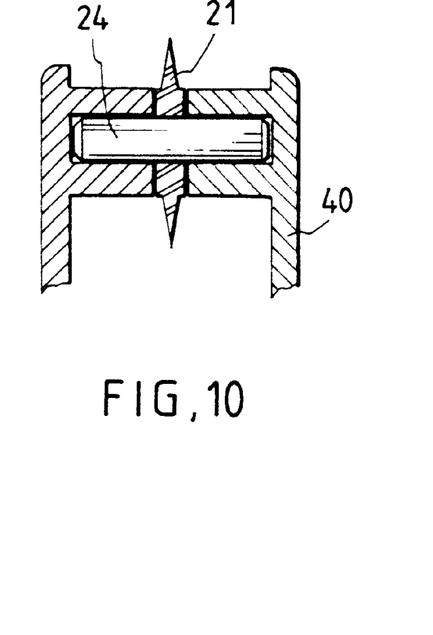
FIG. 10 is a sectional view taken along line 10—10 of FIG. 9.
Figure 11:
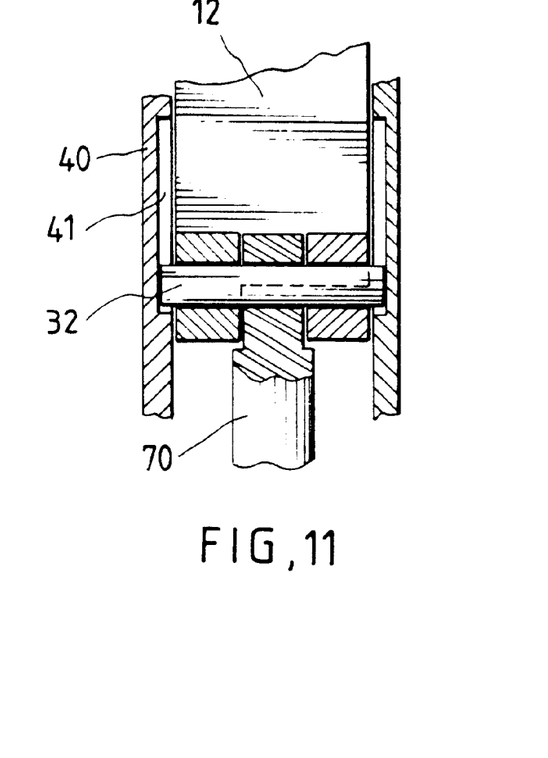
FIG. 11 is a sectional view taken along line 11—11 of FIG. 9.

Referring to FIGS. 4, 5, and 7 specifically, a continuous pipe fastening and cutting operation of the first preferred embodiment of the invention will now be described in detail below. First place a pipe 50 having a diameter no more than 2 mm into the recess 43 on the top of the blade 21. Next, rotate knob 33 clockwise to cause the associated pinion 331 to rotate the meshed-first gear 36. As an end, the first gear 36 rotates counterclockwise and the second gear 37 rotates clockwise respectively. As a result, the sliding toothed member 31 slides downward to compress the coil spring 34 due to gear engagements of left and right teeth thereof with the first and the second gears 36, 37 respectively. In response, the links 12 move downward to cause the pivot members 11 to swing toward the recess 43 (i.e., toward each other) about their pivot axes to cause the rollers 13 to contact the pipe 50. This forms a three-point support of the pipe 50. A continuous rotation of the knob 33 will cause the rollers 13 to press down the pipe 50 toward the blade 21. And in turn both the blade 21 and sliding block 22 move down as the coil spring 23 is compressed. At the same time, the pipe 50 is being cut by the blade 21. The user can stop the rotation of the knob 33 once the pipe 50 has been cut. In an immediate next returning process, the user can push the push button 38 to cause the knob 33 to project above the outer surface of the main body 40 (see FIGS. 4 and 5). As a result, the ratchet wheel 332 and the pinion 331 are disengaged from the pawl 35 and the first gear 36 respectively. In response, the sliding toothed member 31 moves upward immediately as the expansion of the coil spring 34. And in turn the links 12 move upward to cause the pivot members 11 to swing outward away from each other until being stopped in their original unused positions.

Referring to FIGS. 8 to 12, there is shown a second preferred embodiment of the invention. The characteristics of the second preferred embodiment are detailed below. A rotary handle 60 is provided on the bottom of the main body 40. In the main body 40 there are provided a shank 70 having a thread section 71 for threadedly secured to an inner thread 61 of a middle cylinder. The top of the shank 70 is pivotably connected to the bifurcated links 12 by means of a pivot axis 32. Also, the pivot axis 32 is defined to be slidable along the length of the slot 41. A coil spring 44 put on the shank 70 being biased between the bottom of a chamber 45 and the top of an upper neck 46 which is in communication with the chamber 45. The handle 60 comprises a small top peripheral flange 62 having a diameter larger than that of an inwardly extending rim on the bottom of the chamber 45 and a large intermediate peripheral flange 63 having a diameter larger than the outer diameter of the chamber 45. Hence, the handle 60 is prevented from being slid out of the chamber 45. Also, a pivot pin 24 fitted in a channel of the main body 40 is fixedly passed through a center of a top circular blade 21, i.e., the blade 21 is rotatable. Further, the pivot members 11 are substantially horizontally disposed in an unused state.

Figure 12:
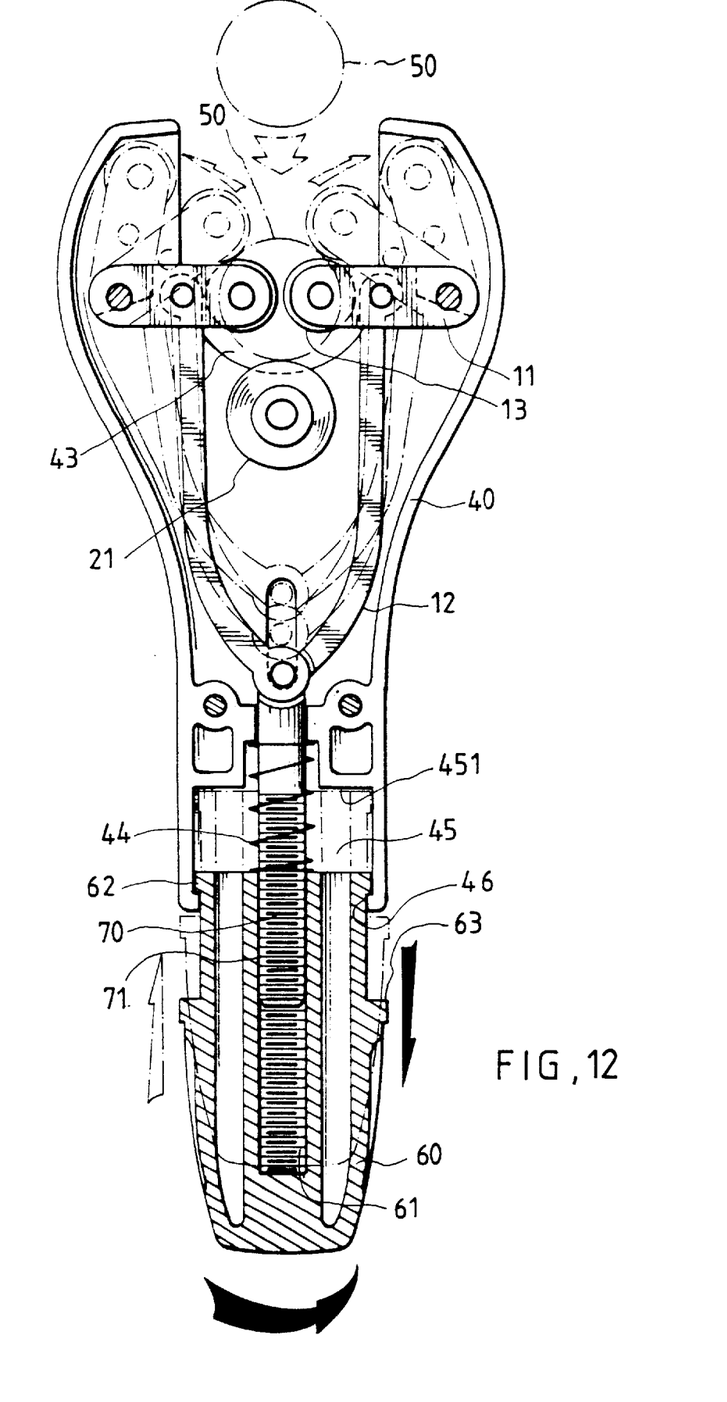
FIG. 12 is a view similar to FIG. 9 illustrating a continuous fastening and cutting operation of the second preferred embodiment of the invention.
Figure 13:
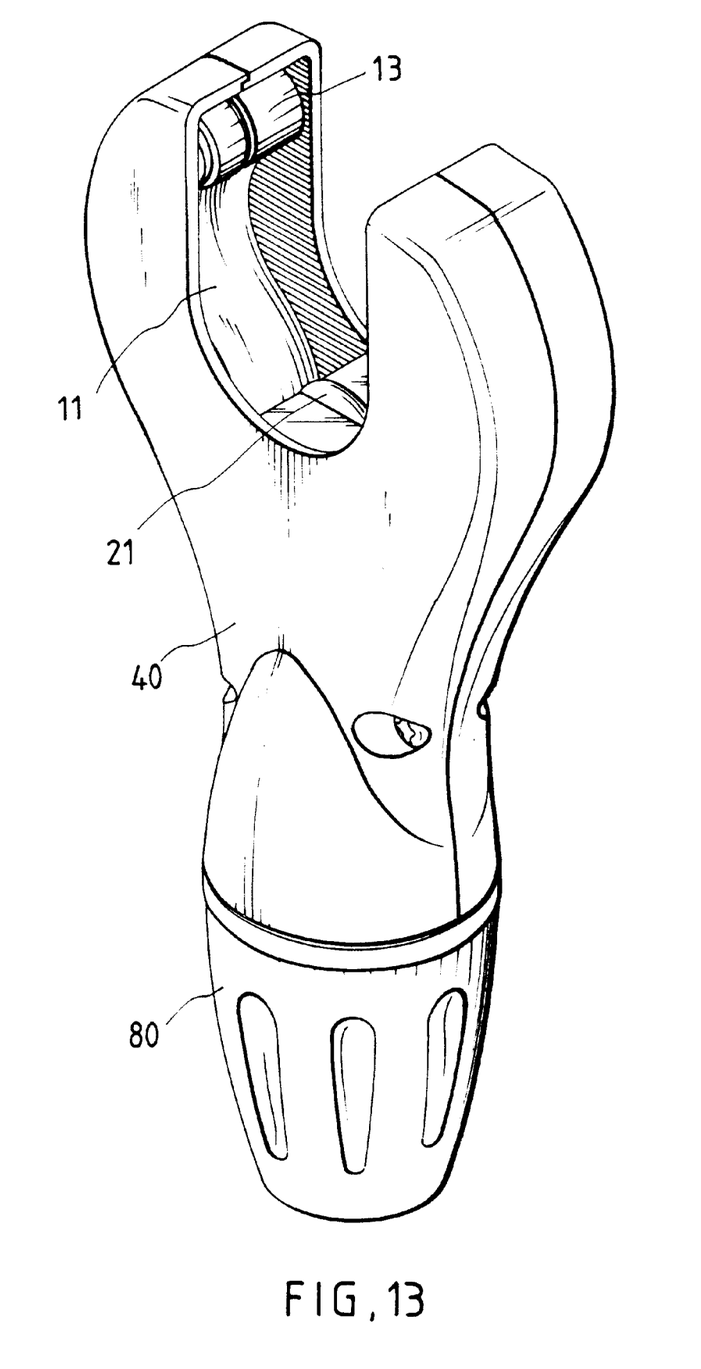
FIG. 13 is a perspective view of a third preferred embodiment of a pipe cutter according to the invention.
Figure 14:
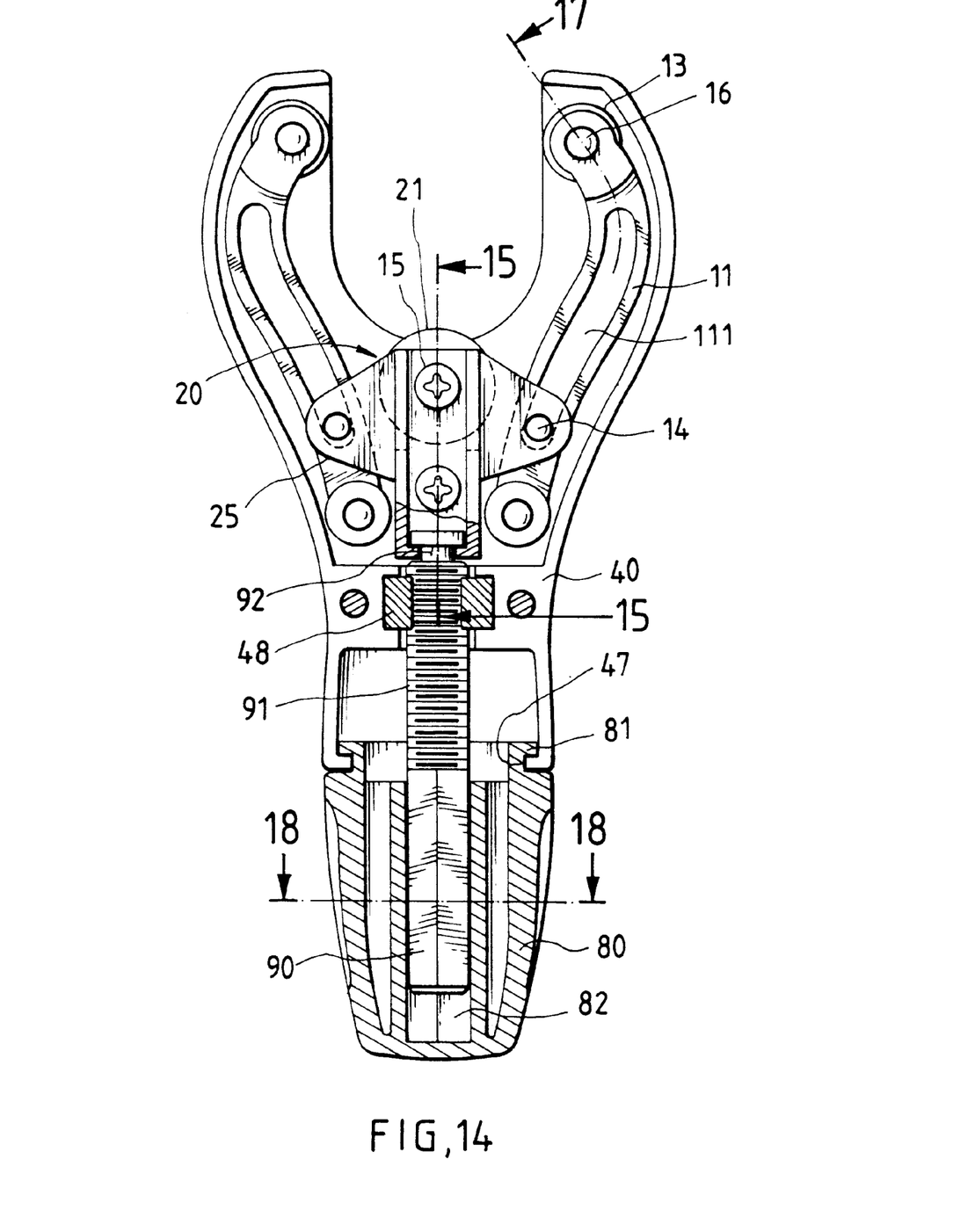
FIG. 14 is a side view in part section with half of the cutters main body of FIG. 13 removed.
Figure 15:
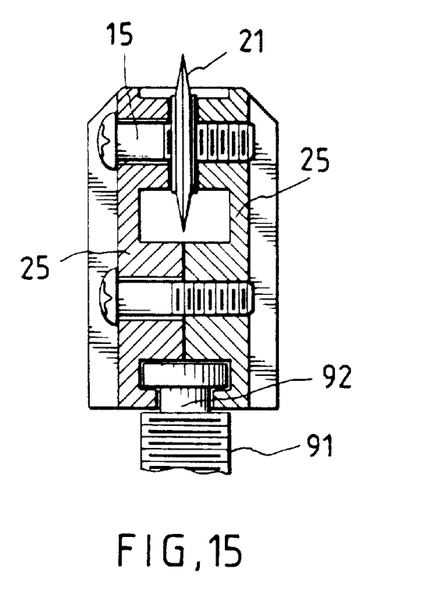
FIG. 15 is a sectional view taken along line 15—15 of FIG. 14.
Figure 16:
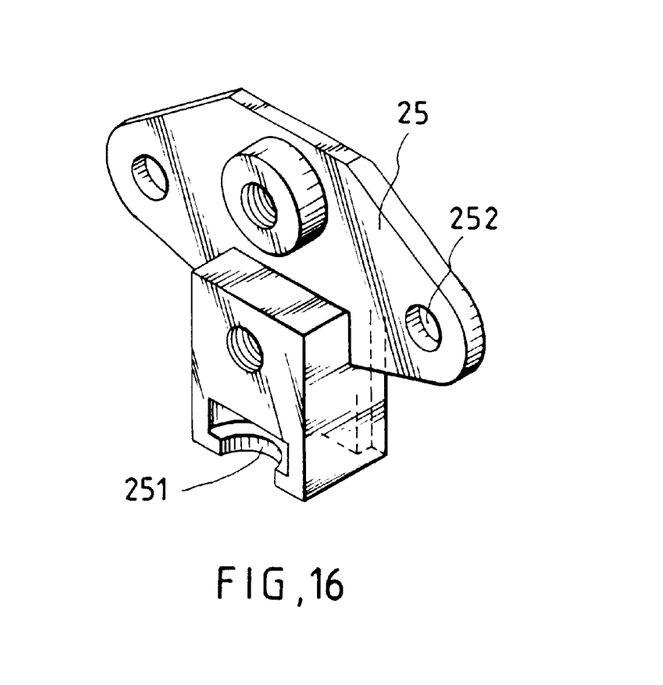
FIG. 16 is a perspective view of the sliding device of FIG. 14.
Figure 17:
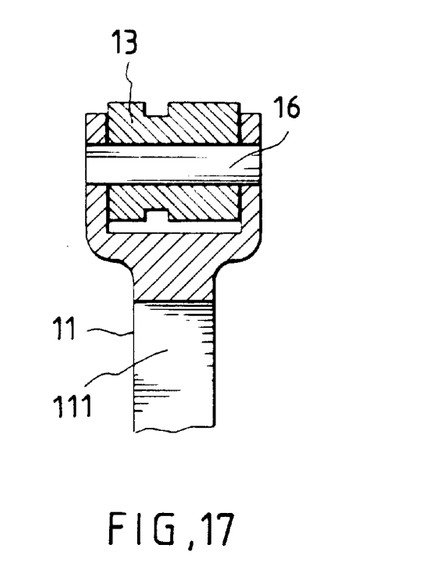
FIG. 17 is a sectional view taken along line 17—17 of FIG. 14.
Figure 18:
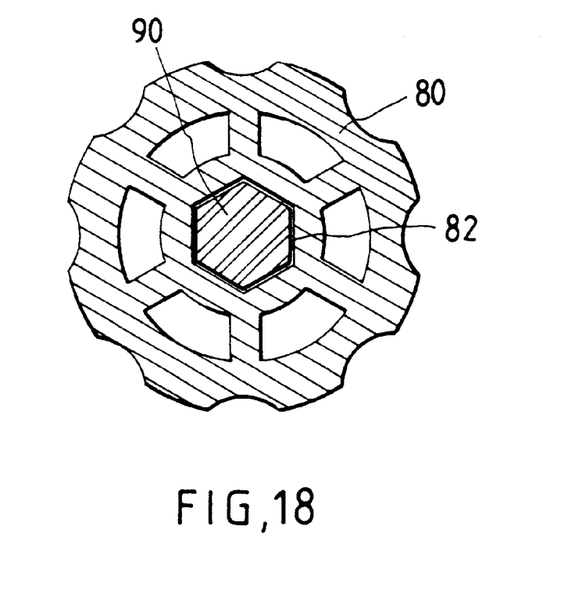
FIG. 18 is a sectional view taken along line 18—18 of FIG. 14.

Referring to FIG. 12 specifically, a continuous pipe fastening and cutting operation of the second preferred embodiment of the invention will now be described in detail below. First rotate the handle 60 in a predetermined direction (e.g., clockwise) with one hand to cause it to move upward with respect to the main body 40 which is held by the other hand. At the same time, the coil spring 44 is compressed. In response, the links 12 move upward to cause the pivot members 11 to swing upward away from the recess 43 (i.e., away each other) about their pivot axes which are pivotably connected to the internal wall of the main body 40. The user can then place a pipe 50 into the recess 43 on the top of the blade 21 once the distance between the rollers 13 is sufficient. Next release the handle 60 to cause it to move downward as the expansion of the coil spring 44. In response, the pivot members 11 swing toward the recess 43 (i.e., toward each other) about their pivot axes to cause the rollers 13 to contact the pipe 50. This forms a three-point support of the pipe 50. Then rotate the handle 60 again to cause it to move upward. In response, the shank 70 moves down as a thread proceeding of the inner thread 61 of the handle 60 and the thread section 71 of the shank 70. The rotation of the handle 60 continues until stopped by the top 451 of the chamber 45. The pipe 50 is being cut by the blade 21 during rotation of the handle 60. The user can stop the rotation of the knob 33 once the pipe 50 has been cut. In an immediate next returning process, the user simply rotates the handle 60 in an opposite direction (e.g., counterclockwise) to remove the cut pipe 50.

Referring to FIGS. 13 to 19, there is shown a third preferred embodiment of the invention. The characteristics of the third preferred embodiment are detailed below. A rotary handle 80 is provided on the bottom of the main body 40. The handle 80 has a top peripheral groove 81 with an inwardly extending rim 47 on the bottom of the chamber 45 received therein for rotatably securing the handle 80 to the main body 40. The handle 80 further comprises a hole 82 having a multi-sided (e.g., hexagonal) section for receiving a conformed shank 90. The shank 90 has an upper thread section 91 with a nut 48 screwed thereonto. In the other embodiment, the nut 48 is replaced by an integral mating thread section within the main body 40. The head 92 of the shank 90 is fixed in a cavity 251 of a sliding device 25. The roller 13 is rotatably connected to a curved link 11 by means of a pivot axis 16. A curved elongate slot 111 is formed in the link 11. The sliding device 25 further comprises two side apertures 252. Each of two pivot axes 14 is passed through the aperture 252 and the slot 111 for slidably connecting the sliding device 25 and the link 11 together. That is, the pivot axis 14 may move upward or downward along the slot 111. Also, a threaded pin 15 in the sliding device 25 is passed through a center of a top circular blade 21, i.e., the blade 21 is rotatable.

Figure 19:
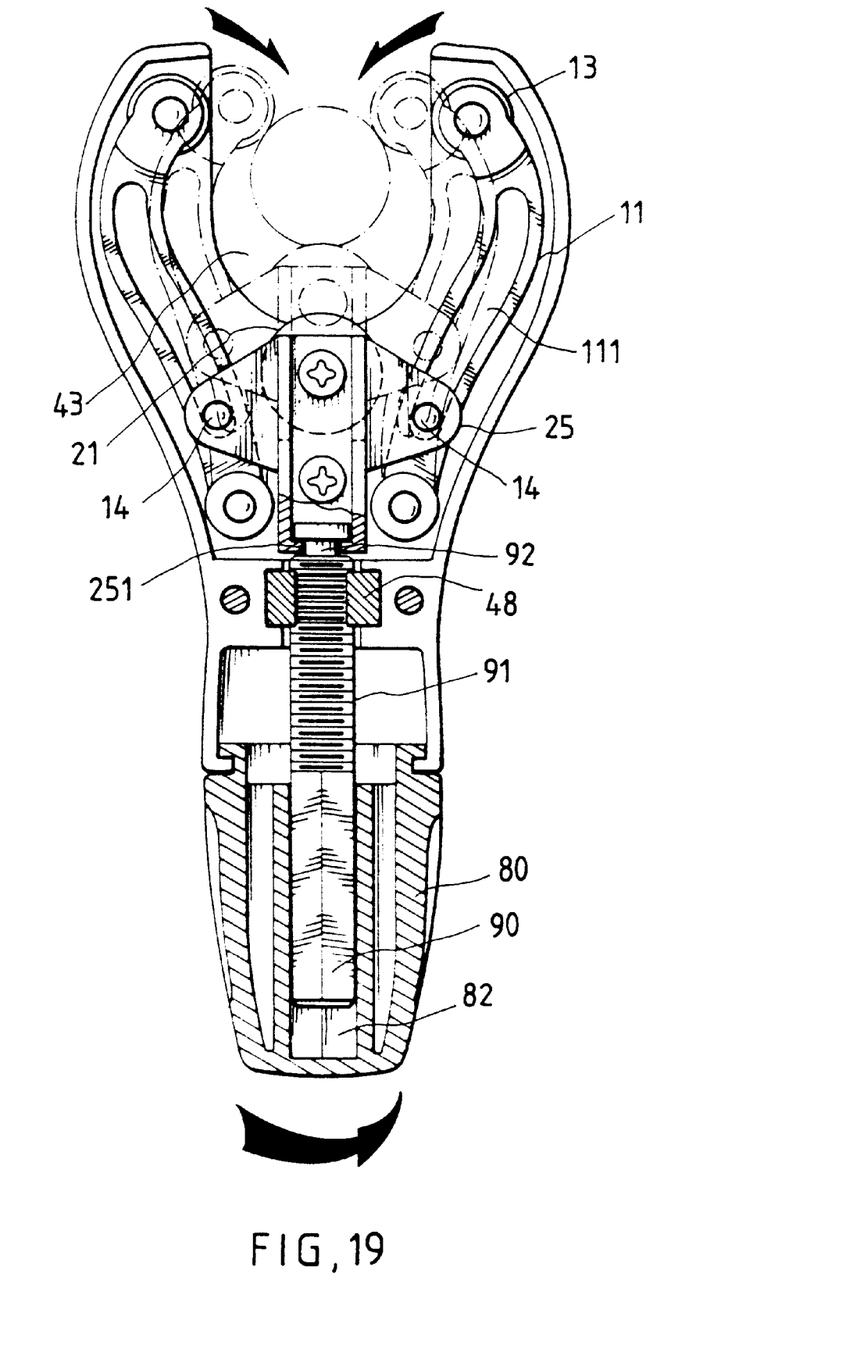
FIG. 19 is a view similar to FIG. 14 illustrating a continuous fastening and cutting operation of the third preferred embodiment of the invention.

Referring to FIG. 19 specifically, a continuous pipe fastening and cutting operation of the third preferred embodiment of the invention will now be described in detail below. First place a pipe 50 into the recess 43 on the top of the blade 21. Next, rotate the handle 80 in a predetermined direction (e.g., counterclockwise) to cause the shank 90 to rotate. In response, the shank 90 moves up as a thread proceeding of the nut 48 and the thread section 91 of the shank 90. Next, the sliding device 25 moves up by the upward movement of the head 92 of the shank 90. That is, the pivot axes 14 move upward along the slots 111. In response, the links 11 swing toward the recess 43 (i.e., toward each other) about their pivot axes which are pivotably connected to the internal wall of the main body 40 until the rollers 13 contact the pipe 50. This forms a three-point support of the pipe 50. A continuous rotation of the handle 80 will cause the rollers 13 to press down the pipe 50. At the same time, the pipe 50 is being cut by the blade 21. The user can stop the rotation of the handle 80 once the pipe 50 has been cut. In an immediate next returning process, the user simply rotates the handle 80 in an opposite direction (e.g., clockwise) to remove the cut pipe 50.

While the invention herein disclosed has been described by means of specific embodiments, numerous modifications and variations could be made thereto by those skilled in the art without departing from the scope and spirit of the invention set forth in the claims.

What is claimed is:

1. A pipe cutter comprising:

a main body including an internal elongate slot, a top recess, and two side guides on a tunnel between the recess and the slot;

a fastening mechanism including two pivot members on both sides of the recess, each pivot member having a lower end pivotably connected to the main body, two bifurcated links each having a top end pivotably connected to the pivot member, and two rollers each rotatably connected to a top end of the pivot member;

a cutting mechanism including a sliding block defined by the guides, a top rotary blade, and a first spring having a top end urged against the bottom of the sliding block; and a transmission mechanism including a sliding toothed member fitted in the main body, a pivot axis slidable along the length of the slot and pivotably connected the links and the top of the sliding toothed member together, an outer knob having a pinion and an outer ratchet wheel both being corotated with the knob in a predetermined direction, a second spring biased between the bottom of the sliding toothed member and the bottom of the main body, a spring biased pawl engageable with the ratchet wheel, a first gear rotatably connected to the main body and meshed with both the teeth at one side of the sliding toothed member and the pinion, a second gear rotatably connected to the main body and meshed with both the teeth at the other side of the sliding toothed member and the first gear, and a spring biased push button in a recessed portion of the main body opposite to the knob, the push button being connected to the pinion;

wherein in a fastening and cutting operation of a pipe, place the pipe into the recess on the top of the blade, rotate the knob clockwise to cause the pinion to rotate the meshed first and the second gears, in response the sliding toothed member slides down to compress the second spring due to gear engagements of left and right teeth thereof with the first and the second gears respectively, the links move down to swing the pivot members toward the recess to cause the rollers to contact the pipe, and a continuous rotation of the knob causes the rollers to press down the pipe toward the blade for being cut as the first spring is compressed; and in a returning process, push the push button to cause the knob to project above the outer surface of the main body for disengaging the ratchet wheel and the pinion from the pawl and the first gear respectively, in response, the sliding toothed member moves upward immediately as the expansion of the second spring, and the links move upward to cause the pivot members to swing outward away from each other until being stopped in their original unused positions.

2. A pipe cutter comprising:

a main body including an internal elongate slot and a top recess;

a fastening mechanism including two pivot members on both sides of the recess, each pivot member being substantially horizontally disposed and pivotably connected to the main body, two bifurcated links each having a top end pivotably connected to the pivot member, and two rollers each rotatably connected to a top end of the pivot member;

a cutting mechanism including a top rotary blade; and a transmission mechanism including a rotary handle on the bottom of the main body, the handle including a top peripheral flange and an intermediate peripheral flange, an internal threaded shank threadedly secured to an inner thread of a middle cylinder, the top of the shank being pivotably connected to the links by means of a pivot axis which is defined to be slidable along the length of the slot, a chamber on the top of the handle and having an inwardly extending rim on the bottom, a neck on the top of the chamber being in communication with the chamber, and a spring put on the shank being biased between the bottom of the chamber and the top of the neck wherein the top peripheral flange has a diameter larger than that of the rim and the intermediate peripheral flange has a diameter larger than an outer diameter of the chamber so as to prevent the handle from being slid out of the chamber;

wherein in a fastening and cutting operation of a pipe, rotate the handle in a first direction to cause it to move upward with respect to the main body with the spring being compressed, in response, the links move upward to cause the pivot members to swing upward away from the recess, place the pipe into the recess on the top of the blade, release the handle to cause it to move downward as the expansion of the spring, in response, the pivot members swing toward the recess to cause the rollers to contact the pipe, rotate the handle again to cause it to move upward, in response, the shank moves down as a thread proceeding the middle cylinder and the shank, continues the rotation of the handle until stopped by the chamber with the pipe being cut by the blade during the rotation of the handle; and in a returning process, rotates the handle in an opposite second direction to remove the cut pipe.

3. A pipe cutter comprising:

a main body including a top recess;

a fastening mechanism including two links on both sides of the recess, each link being pivotably connected to the main body, an elongate slot in each of the links, and two rollers each rotatably connected to a top end of the link;

a cutting mechanism including a sliding device having a lower cavity and two side joints slidably disposed in the slots for slidably connecting the sliding device and the link together and a top rotary blade rotatably disposed in the sliding device; and a transmission mechanism including a rotary handle on the bottom of the main body, the handle being rotatably fixed to the bottom of the main body, the handle including a multi-sided hole, and a shank with a lower portion received in the hole and an upper portion fixed in the cavity, the shank having an upper thread section and a mating thread member screwed thereonto;

wherein in a fastening and cutting operation of a pipe, place the pipe into the recess on the top of the blade, rotate the handle in a first direction to cause the shank to rotate, in response, the shank moves up as a thread proceeding of the nut and the thread section thereof, the sliding device is moved up by the upward movement of the shank with the side joints moving upward along the slots, in response, the links swing toward the recess until the rollers contact the pipe, continuously rotate the handle to cause the rollers to press down the pipe with the pipe being cut by the blade during the rotation of the handle; and in a returning process, rotates the handle in an opposite second direction to remove the cut pipe.

4. The pipe cutter of claim 3, wherein the multi-sided hole of the handle has a hexagonal section.

5. The pipe cutter of claim 3, wherein the mating thread member of the shank is a separate nut.

6. The pipe cutter of claim 3, wherein the mating thread member of the shank is integrally formed with the main body.

* * * * *